(12) United States Patent
Takano et al.

(10) Patent No.: US 6,237,681 B1
(45) Date of Patent: May 29, 2001

(54) VEHICLE REFRIGERATING CYCLE APPARATUS AND METHOD FOR INHIBITING CYCLE CORROSION AND FOR FACILITATING RAPID PASSENGER COMPARTMENT WARM-UP DURING LOW TEMPERATURE CONDITIONS

(75) Inventors: Yoshiaki Takano, Kosai; Satoshi Izawa, Kariya; Yasushi Yamanaka, Nakashima-gun; Hajime Ito, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/427,395

(22) Filed: Oct. 25, 1999

(30) Foreign Application Priority Data

Nov. 9, 1998 (JP) .................................................. 10-317860

(51) Int. Cl.[7] ................................ F25B 13/00; F25B 1/00
(52) U.S. Cl. ......................... 165/241; 62/196.4; 62/228.3; 165/62
(58) Field of Search ............................. 62/196.4, 228.3, 62/159, 228.5, 196.1, 197, 244, 324.6; 165/62, 42, 43, 202, 240, 24

(56) References Cited

U.S. PATENT DOCUMENTS

| | | | |
|---|---|---|---|
| 5,291,941 | 3/1994 | Enomoto et al. | 165/62 |
| 6,076,366 | * 6/2000 | Takano et al. | 62/196.4 |
| 6,105,375 | * 8/2000 | Takano et al. | 62/149 |
| 6,125,643 | * 10/2000 | Noda et al. | 62/196.4 |

* cited by examiner

Primary Examiner—William Wayner
(74) Attorney, Agent, or Firm—Harness, Dickey & Pierce, PLC

(57) ABSTRACT

A refrigerating cycle apparatus that inhibits system corrosion and abnormally high pressure during startup of a first refrigerant circuit by preventing air from penetrating into a refrigerant compressor during low-temperature startup of a second auxiliary refrigerant circuit. An apparatus evaporator heats air flowing through an air conditioning duct as a high temperature/high pressure gas refrigerant discharged from an engine-driven compressor is guided through a pressure-reducing unit and the evaporator, bypassing a condenser. Thereafter, the refrigerant is returned to the compressor, which is automatically stopped when a compressor suction pressure, or a physical quantity representative of the suction pressure, becomes lower than a predetermined value.

8 Claims, 7 Drawing Sheets

VEHICLE REFRIGERATING CYCLE APPARATUS AND METHOD FOR INHIBITING CYCLE CORROSION AND FOR FACILITATING RAPID PASSENGER COMPARTMENT WARM-UP DURING LOW TEMPERATURE CONDITIONS

CROSS-REFERENCE TO RELATED APPLICATION

The present invention is related to, and claims priority from, Japanese Patent Application No. Hei. 10-317860, the contents of which are incorporated herein by reference.

BACKGROUND OF THE PRESENT INVENTION

1. Technical Field

The present invention relates generally to vehicle air conditioning systems, and particularly to a refrigerating cycle apparatus in which a high temperature/high pressure gas refrigerant discharged from a refrigerant compressor is guided through a pressure reducer and then an internal heat exchanger to heat air flowing through an air conditioner duct.

2. Related Art

A conventional vehicle air conditioning system includes a hot-water warming unit in which engine cooling water is guided to a hot-water heater located in an air conditioning duct to heat air flowing through the duct. However, such a hot water warming unit is inefficient during engine startup when both outside air and cooling water temperatures are low.

Japanese Patent Application Laid-Open No. Hei. 5-223357 describes a vehicle air conditioning apparatus having an auxiliary warming unit adapted to assist the main warming unit by guiding a high temperature/high pressure gas refrigerant discharged from an engine-driven refrigerant compressor to an internal heat exchanger via a pressure reducing unit, so that the heat exchanger heats the air flowing through an air conditioning duct.

When cooling water temperature is higher than a predetermined temperature and the warming power of the main warming unit is sufficiently high, the vehicle interior is sufficiently heated, and the refrigerant compressor is turned OFF to stop the hot gas heater cycle. Further, when the cooling water temperature is lower than the predetermined temperature and the warming power of the main warming unit is therefore insufficient, the refrigerant compressor is turned ON to start the hot gas heater cycle.

The hot gas heater cycle of the above system is adapted such that heat generated by compression work of the refrigerant compressor is radiated by a vehicle internal heat exchanger. The heat is radiated in a manner different from a typical heat pump cycle in which the vehicle internal heat exchanger functions as a refrigerant condenser, and in which a vehicle external heat exchanger functions as a refrigerant evaporator. Therefore, the cycle can operate even when the outside air temperature is very low, such as in the vicinity of −40° C.

Figure 7:
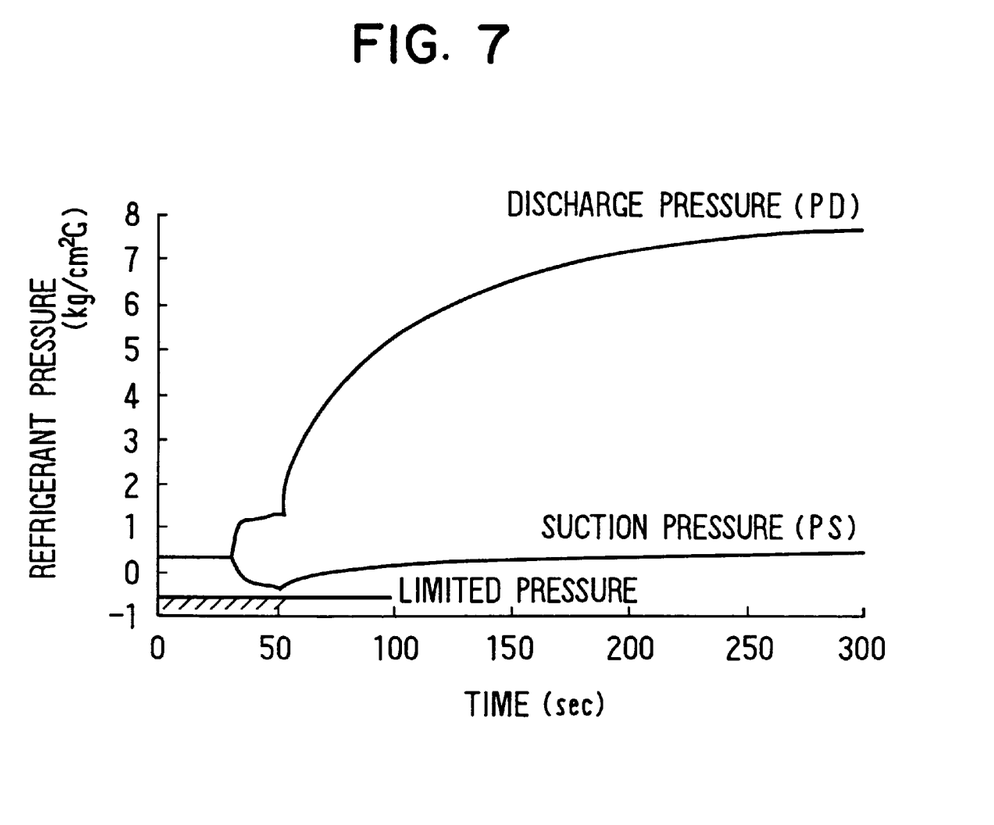
FIG. 7 is a prior art timing diagram showing changes in a discharge pressure (PD) of a compressor just after the compressor is started, as well as a compressor suction pressure (PS).

However, in the above heater cycle, when the outside temperature is around −20° C., negative pressure forms due to characteristics of refrigerant HFC-134a before the refrigerant compressor is started. Further, due to characteristics of the hot gas heater cycle, when the suction portion of the refrigerant compressor is at a negative pressure, suction pressure (PS) of a compressor suction portion just after the compressor starts typically decreases initially, as shown in FIG. 7, before gradually increasing. As a conventional engine-driven refrigerant compressor typically has a weak shaft seal, if compressor suction pressure decreases below a predetermined value (for example −0.5 kg/cm$^2$ G), air tends to penetrate into the compressor from the seal portion. Such air penetration is undesirable, as it tends to cause corrosion and high pressure to abnormally increase.

SUMMARY OF THE INVENTION

In view of the above limitations of the prior art, it is an object of the present invention to inhibit air from penetrating into the refrigerant compressor when a second auxiliary refrigerant circuit is started during very low outside temperature conditions.

More particularly, according to the present invention, when the second refrigerant circuit is started at a time of very low outside air temperature, when the physical quantity representative of a detected compressor suction pressure becomes less than a predetermined value, it is possible to prevent air from penetrating into the refrigerant compressor without improving the compressor shaft seal. Air penetration is prevented by controlling the refrigerant compressor to automatically stop the second refrigerant circuit. Further, since it is possible to prevent air from penetrating into the refrigerant compressor, corrosion and abnormally high pressure during first refrigerant circuit startup can be prevented.

Further, when the second refrigerant circuit is started during very low outside air temperature conditions, after the suction pressure of the refrigerant compressor or the physical quantity representative of the suction pressure has become less than a predetermined value and the second refrigerant circuit has been automatically stopped, it is possible to assist the main warming unit by restarting the second refrigerant circuit after a predetermined elapsed time so that the vehicle interior can be rapidly warmed during initial startup of the main warming unit.

DETAILED DESCRIPTION OF THE PRESENT INVENTION

Referring to FIGS. 1–4, a first embodiment of the present invention will now be described. A vehicle air conditioner 1 according to the first embodiment includes an air conditioner control unit ECU 10. The air conditioner 1 includes an air conditioning duct 2 forming an air passage 11 for guiding conditioned air into the interior of a vehicle. At an air downstream side of the air conditioning duct 2, an outside air suction port, an inside air suction port and an inside/outside air switching door (not shown) are provided. At an air upstream side, a centrifugal blower 3 and blow ports, such as a defroster blow port, a face blow port and a foot blow port, and a mode switching door (not shown) are provided.

Figure 1:
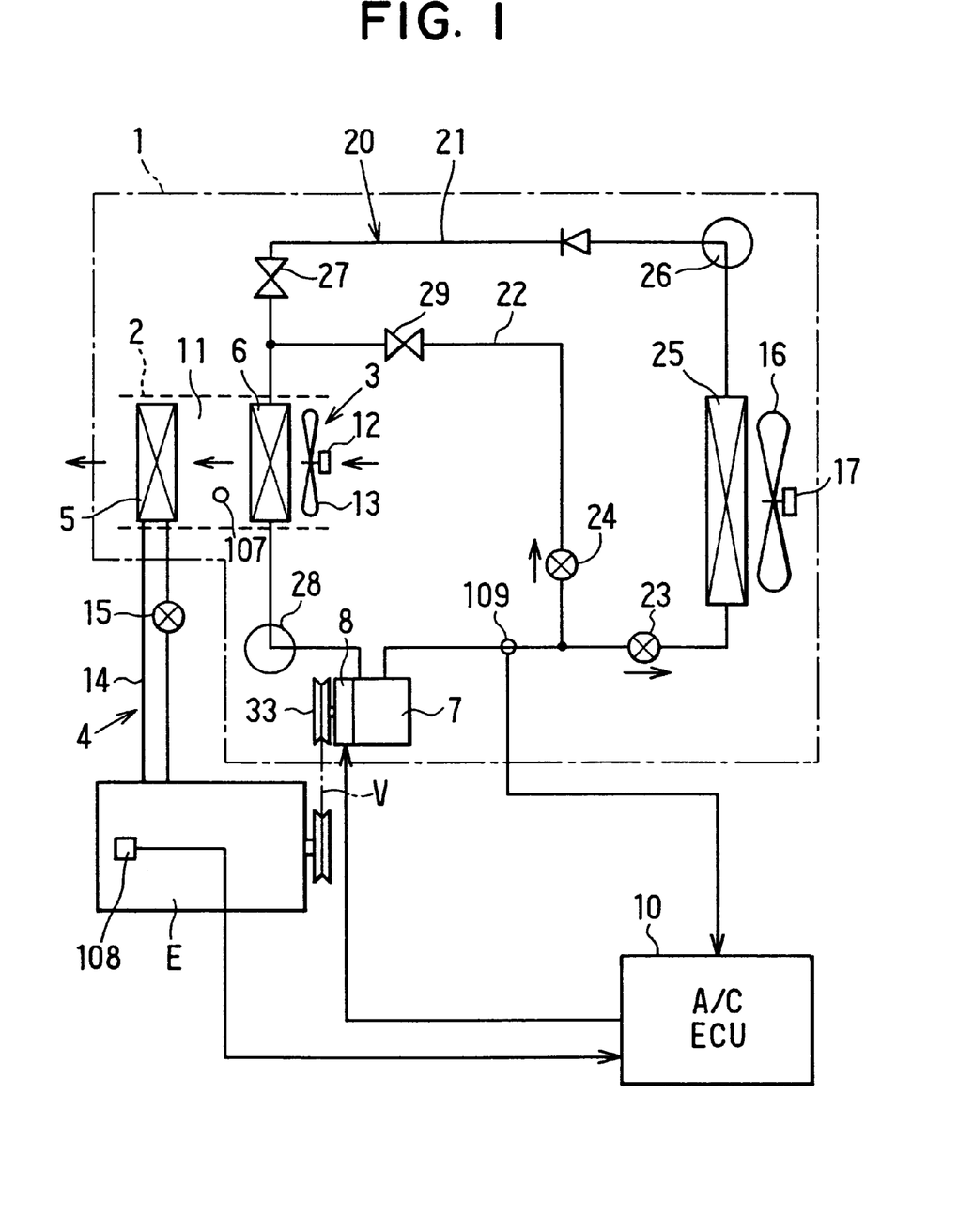
FIG. 1 is a system diagram showing the structure of a vehicle air conditioning apparatus according to a first embodiment of the present invention.

The centrifugal blower 3 is composed of a scroll casing provided integrally with the air conditioning duct 2, a blower motor 12 controlled by a blower driving circuit (not shown), and a centrifugal fan 13 rotatably driven by the blower motor 12 and having a blowing capacity that may be controlled in a continuous or stepwise manner.

At a blow port upstream side, a hot-water heater 5 of a hot-water warming unit 4 re-heats air that has passed through an evaporator 6. The hot-water heater 5 is disposed at a middle location in a cooling water circuit 14, through which a water pump (not shown) driven by a vehicle engine E circulates cooling water. If a hot-water valve 15 disposed in the cooling water circuit 14 is opened, the hot-water heater 5 causes the cooling water, having absorbed the engine exhaust heat of the engine E, to circulate therethrough. As a result, the air is re-heated so that the cooling water becomes a heat source. In other words, it acts as a downstream side, or second, heat exchanger for heating air. Preferably, the hot-water warming unit 4 is composed of the engine E, the hot-water heater 5, the cooling water circuit 14, and the hot-water valve 15.

Next, between the centrifugal blower 3 and the hot-water heater 5, the evaporator 6, which forms one constituent part of a vehicle refrigerating cycle unit 20, is disposed across the air passage 11 in the air conditioning duct 2. The refrigerating cycle unit 20 also includes a first refrigerant circuit 21, a second refrigerant circuit 22, and first and second electromagnetic valves 23, 24 for switching the first and second refrigerant circuits 21, 22.

The first refrigerant circuit 21 is for circulating a high temperature/high pressure gas refrigerant discharged from a compressor 7 in the following order: first electromagnetic valve 23; condenser 25; receiver 26; expansion valve 27; evaporator 6; accumulator 28; and compressor 7. Further, the second refrigerant circuit 22 is for circulating a high temperature/high pressure gas refrigerant discharged from the compressor 7 in the following order: second electromagnetic valve 24; pressure reducing unit; 29; evaporator 6; accumulator 28; and compressor 7.

If the first electromagnetic valve 23 is opened and the second electromagnetic valve 24 is closed, the refrigerating cycle unit 20 causes the refrigerant to circulate through the first refrigerant circuit 21. Further, if the first electromagnetic valve 23 is closed and the second electromagnetic valve 24 is opened, the refrigerating cycle unit 20 causes the refrigerant to circulate through the second refrigerant circuit 22. Incidentally, the circuit switch includes the first and second electromagnetic valves 23, 24. Further, numeral 16 denotes a cooling fan rotatably driven by a drive motor 17 that forcibly blows outside air to the condenser 25.

The evaporator 6 corresponds to an internal heat exchanger. When the refrigerant flows through the first refrigerant circuit 21, the evaporator causes a low temperature vapor/liquid two-phase refrigerant flowing into the circuit 21 from the expansion valve 27 to evaporate. Thus, the evaporator 6 functions as a cooling heat exchanger for cooling the air passing through it.

Further, when the refrigerant flows through the second refrigerant circuit 22, the evaporator 6 functions as a first heating heat exchanger for heating the air passing through it by passing a high temperature gas refrigerant flowing into it from the pressure reducing unit 29. Here, the expansion valve 27 not only causes the refrigerant to adibiatically expand but also adjusts a circulation amount of the refrigerant in compliance with a refrigerant overheat degree of an evaporator outlet.

The compressor 7 is preferably an engine-driven piston-type fixed volume compressor which compresses the refrigerant sucked from its suction port and discharges a high temperature/high pressure gas refrigerant from its discharge port. An electromagnetic clutch 8 for transmitting or interrupting rotary power of the engine E to or from the compressor 7 is connected to a shaft of the compressor 7. Further, a belt V is rotated both by a pulley 33 of the electromagnetic clutch 8 and a crank pulley of the engine E, thereby facilitating transmission of the engine rotary power to the compressor 7.

When the electromagnetic clutch 8 is energized (ON), the engine rotary power is transmitted to the compressor 7 via the belt V and the electromagnetic clutch 8. The refrigerating cycle unit 20 is started, and thus an air cooling action or an air heating action is performed by the evaporator 6. Further, when the electromagnetic clutch 8 is de-energized (OFF), the rotary power of the engine E is not transmitted to the compressor 7, and the air cooling or heating action is stopped.

Figure 2:
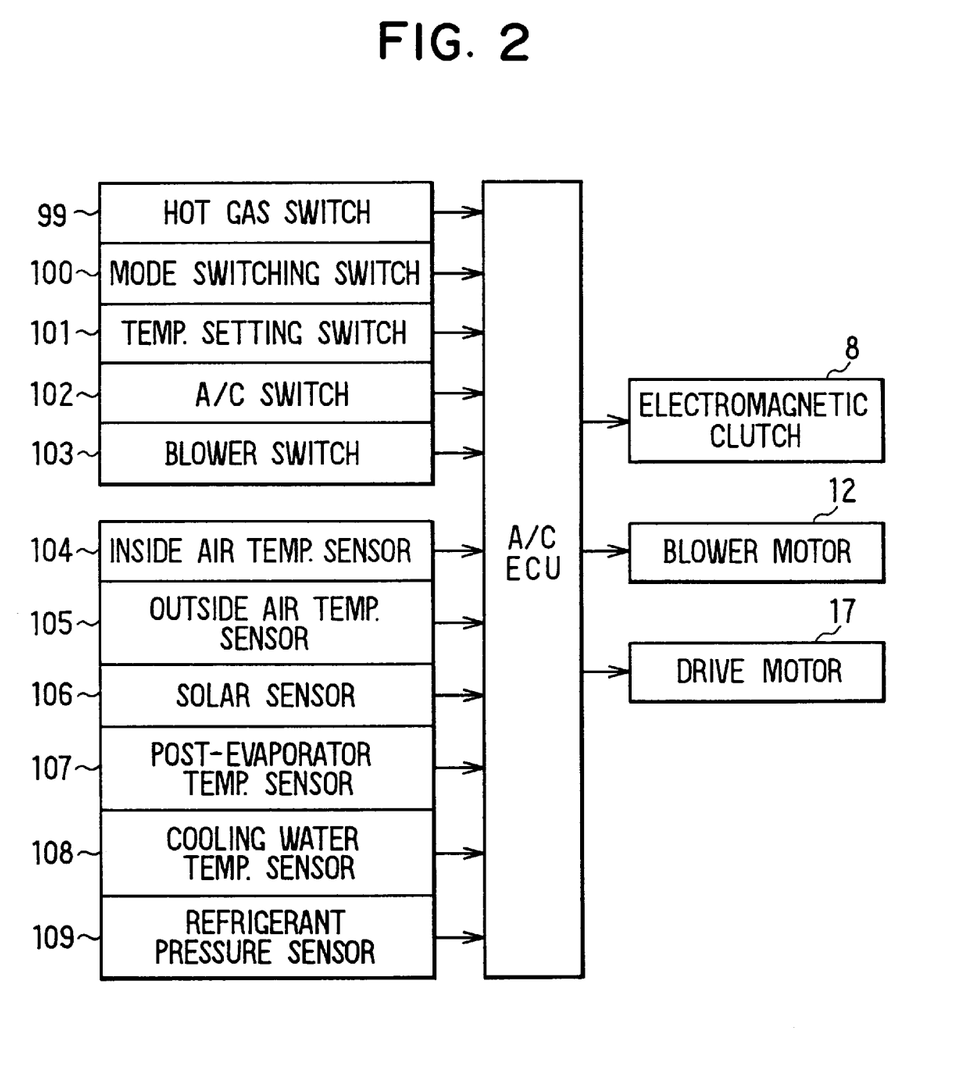
FIG. 2 is a block diagram showing a control system of the vehicle air conditioning apparatus in the first embodiment)

Respective switch signals from respective switches on an air conditioning operation panel (not shown) provided in the vehicle passenger compartment are input to the air conditioning ECU 10. A hot gas switch (S/W) 99, a mode switching switch 100 for switching an air conditioning mode to a cooler mode or a heater mode, a temperature-setting switch 101 for setting a vehicle interior temperature to a desired temperature, an air conditioning switch 102 for starting or stopping the refrigerating cycle unit 20, a blower switch 103 for turning the centrifugal blower 3 ON/OFF, and the like are provided on the air conditioning operation panel.

Further, inside the air conditioning ECU 10, a known microcomputer including a CPU, ROM, RAM and the like is provided, and respective sensor signals from respective sensors are input to the microcomputer after being A/D-converted by an input circuit (not shown). It should be appreciated that the air conditioning ECU 10 is programmed so that, when an ignition switch of the engine E is turned on (IG·ON), control processing is started.

Also, respective sensor signals from an inside air temperature sensor 104 for detecting a vehicle interior air temperature, an outside air temperature sensor 105 for detecting a vehicle external air temperature, and a solar energy sensor 106 for detecting an amount of solar energy coming into the vehicle interior are input to the ECU 10.

Further, respective sensor signals from a post-evaporator temperature sensor 107 for detecting the temperature of air just after having passed the evaporator 6, a cooling water temperature sensor 108 for detecting the temperature of cooling water flowing into the hot-water heater 5, and a refrigerant pressure sensor 109 for detecting a high pressure (PD) of the refrigerating cycle unit 20 are also input into the ECU 10.

Incidentally, the respective switches and sensors detect air conditioning environmental factors required for air-conditioning the vehicle interior, and thermistors are preferably used for the inside air temperature sensor 104, the outside air temperature sensor 105, the post-evaporator temperature sensor 107, and the cooling water temperature sensor 108. Further, the air conditioning ECU 10 has a revolution speed detector which inputs an engine revolution speed sensor signal (not shown) and thereby operates the compressor revolution speed.

Next, an ECU warming mode according to the present embodiment will be described with reference to FIGS. 1–3.

Figure 3:
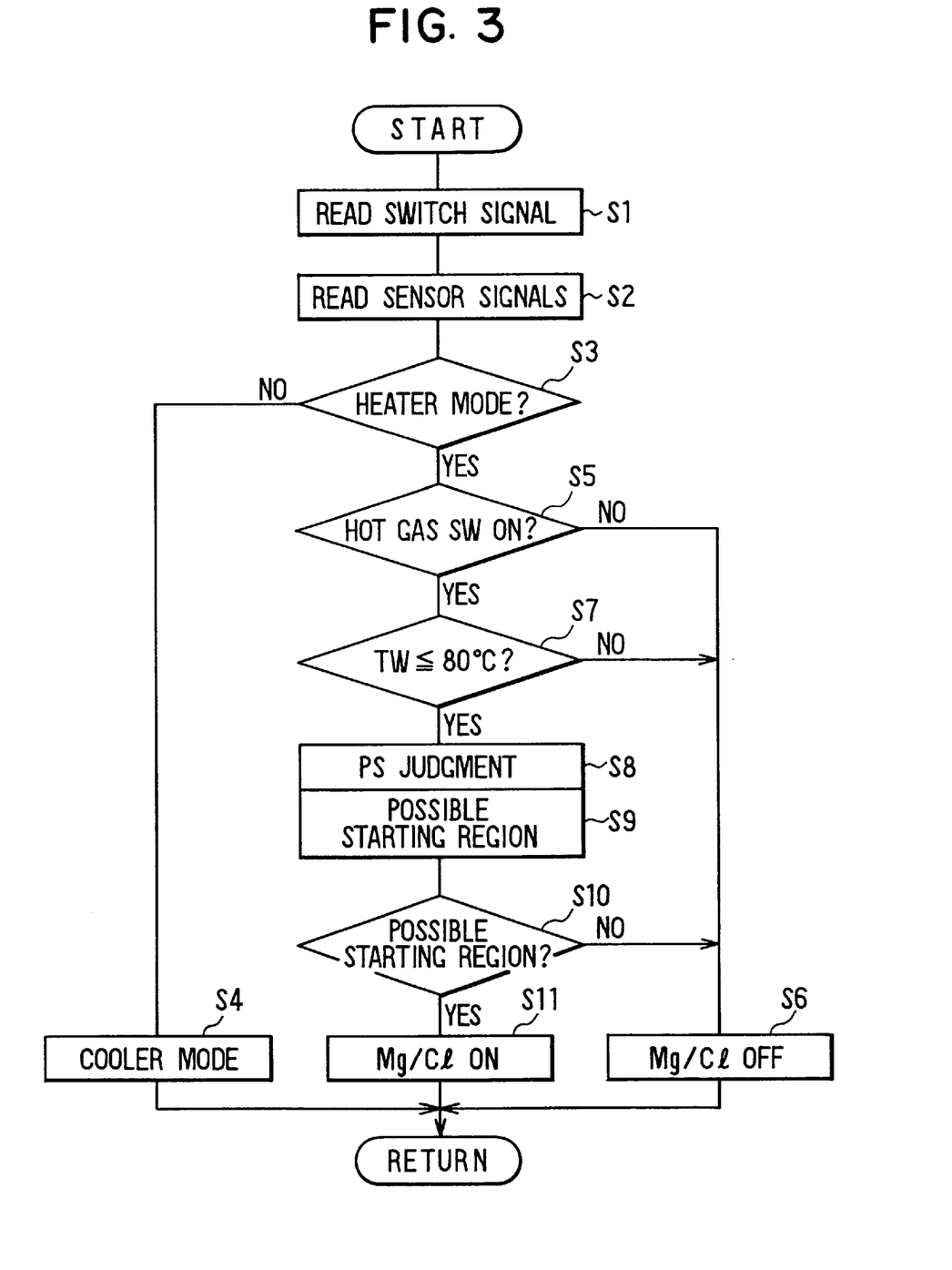
FIG. 3 is a flow diagram illustrating compressor control methodology of an air conditioning ECU of the first embodiment.

If the ignition switch is turned on (IG·ON), the control methodology shown in FIG. 3 is started. First, the respective signals are read from the respective switches on the air conditioning operation panel (step S1). More particularly, an ON or OFF signal of the hot gas S/W 99 and a set state (cooler mode or heater mode) of the mode switching switch 100 are read.

Next, the respective sensor signals are read (step S2). More specifically, an outside air temperature (TAM) detected by the outside air temperature sensor 105, a cooling water temperature (TW) detected by the cooling water temperature sensor 108, and a discharge pressure (PD) of the compressor 7 detected by the refrigerant pressure sensor 109 are read. Further, based on an engine revolution speed input from the engine revolution speed sensor, a revolution speed (NC) of the compressor 7 is computed and read.

Next, it is determined whether the air conditioning mode is a heater mode. That is, it is determined whether a heater mode is set by the mode switching switch 100 (step S3). When the result of this determination is NO, i.e., when the air conditioning mode is a cooler mode, the electromagnetic clutch (Mg/Cl) 8 is energized (ON) to thereby start the compressor 7, the first electromagnetic valve 23 is opened, the second electromagnetic valve 24 is closed, and the refrigerating cycle unit 20 is operated by the first refrigerant circuit 21 (step S4). Thereafter, the routine of FIG. 3 is exited.

Further, when the determination at step S3 is YES, i.e., when the mode is a heater mode, it is determined whether the hot gas switch 99 is turned on (ON) (step S5) When this determination is NO, the electromagnetic clutch (Mg/Cl) 8 is de-energized (OFF) to thereby automatically stop the compressor 7, and the first and second electromagnetic valves 23, 24 are closed (step S6). Thereafter, the routine is exited.

Further, when a result of the determination at step S5 is YES, i.e., when the hot gas switch is ON, it is determined whether the cooling water temperature (TW) is equal to or less than a predetermined temperature (for example 80° C.) (step S7). When the determination is NO, control processing proceeds to step S6.

Further, when the determination at step S7 is YES, a suction pressure (PS) of the compressor 7 is computed. More specifically, the suction pressure (PS) of the compressor 7 is presumed from a revolution speed (NC) of the compressor 7 computed based on a sensor signal from the engine revolution speed sensor, and from an outside air temperature (TAM) detected by the outside air temperature sensor 105 (step SB).

Based on the suction pressure (PS) of the compressor 7 at step S8, a possible starting region is determined, within which if the compressor 7 is started, a suction portion of the compressor 7 at a positive pressure so that air penetration through shaft seal portion of the compressor 7 is inhibited (step S9).

Next, it is determined whether the suction pressure (PS) of the compressor 7 determined at step S8 is equal to or higher than a predetermined value (for example $-0.5$ kg/cm$^2$ G). More particularly, it is determined whether the outside air temperature (TAM) or the revolution speed (NC) of the compressor 7 is within the possible starting region of the compressor 7 (step S10). When a result of this determination is NO, processing proceeds to step S6.

Further, when a result of the determination at step S10 is YES, the electromagnetic clutch (Mg/Cl) 8 is energized (ON) to thereby (re-)start the compressor 7, the first electromagnetic valve 23 is closed, the second electromagnetic valve 24 is opened, and thus the refrigerating cycle unit 20 is operated by the second refrigerant circuit 22 (step S11). Thereafter, the routine of FIG. 3 is exited.

Next, operational modes of the vehicle air conditioning apparatus of this embodiment are briefly described based on FIGS. 1–4.

A) Cooler Mode

When the air conditioning mode is a cooler mode, the electromagnetic clutch 8 is ON, the first electromagnetic valve 23 is opened, and the second electromagnetic valve 24 is closed. Therefore, a high temperature/high pressure gas refrigerant discharged from the compressor 7 circulates through the first refrigerant circuit 21 and flows into the evaporator 6. The air sucked into the air conditioning duct 2 is cooled by being heat-exchanged with a low temperature/low pressure refrigerant in the evaporator 6, and is blown into a vehicle interior. As a result, the vehicle interior is cooled.

B) Heater Mode

When the air conditioning mode is a heater mode, the hot gas switch 99 is ON. When the cooling water temperature (TW) is equal to or lower than a predetermined temperature (for example 80° C.) and thus the hot-water warming unit 4 cannot heat the vehicle interior sufficiently and it is within a possible starting region of the compressor 7, the electromagnetic clutch 8 is turned ON, the first electromagnetic valve 23 is closed and the second electromagnetic valve 24 is opened. Further, the hot-water valve 15 is opened as well.

Therefore, the high temperature/high pressure gas refrigerant discharged from the compressor 7 circulates through the second refrigerant circuit 22 and flows into the evaporator 6. Further, the cooling water, having absorbed the exhaust heat of the engine E, circulates through the cooling water circuit 14 and flows into the hot-water heater 5. The air sucked into the air conditioning duct 2 is heated by being heat-exchanged with a high temperature/low pressure refrigerant in the evaporator 6 and is further heated by being heat-exchanged with a high temperature cooling water in the hot-water heater 5 and blown into a vehicle interior. As a result, the vehicle interior is warmed.

Figure 4:
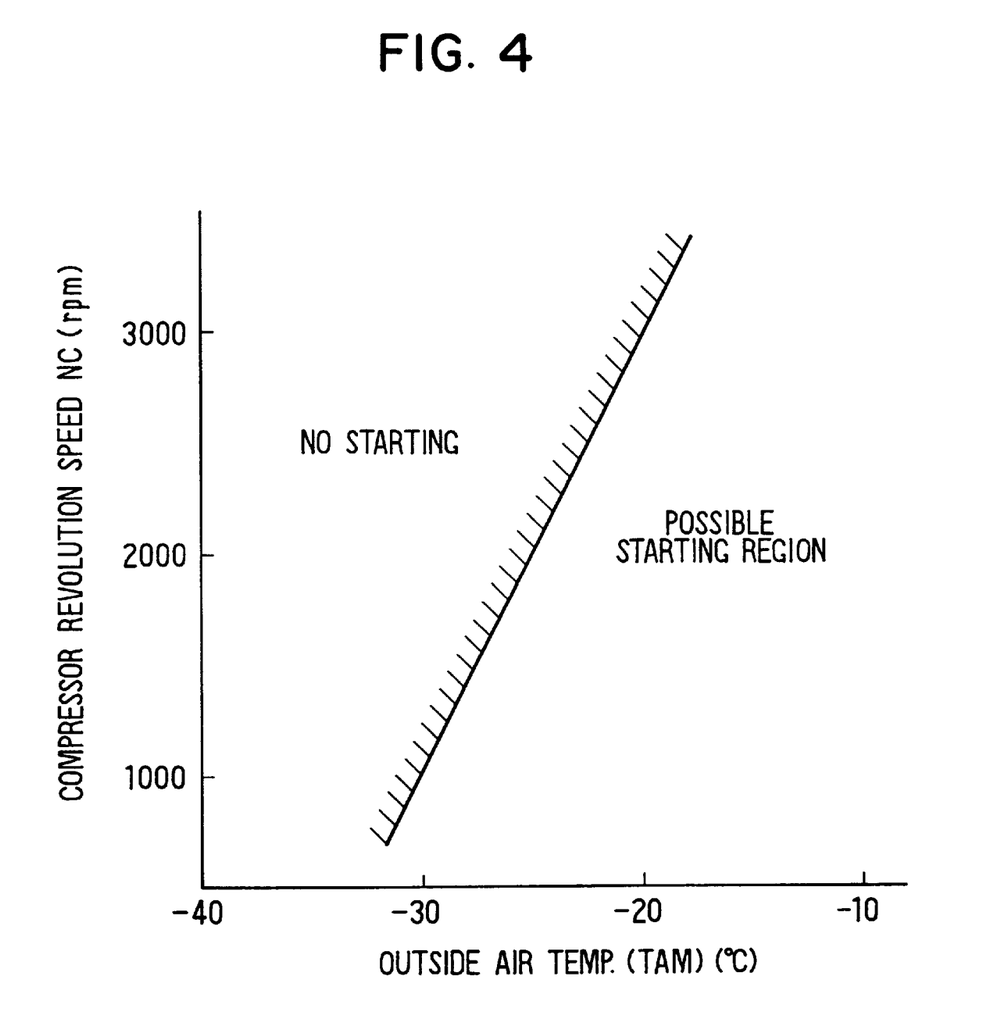
FIG. 4 is a graph showing a possible starting region of a compressor determined from compressor revolution speed and an outside air temperature in the first embodiment.

As shown in FIG. 4, the possible compressor starting region in this embodiment is decided by determining the suction pressure (PS) of the compressor 7 from, for example, the revolution speed (NC) of the compressor 7 and the outside air temperature (TAM).

When, for example, the outside air temperature is $-30°$ C. and the revolution speed of the compressor 7 is 1000 rpm, it is determined that the suction pressure (PS) of the compressor 7 is a predetermined value (for example $-0.5$ kg/cm$^2$ G). Therefore, if the revolution speed of the compressor 7 is 1000 rpm and the outside air temperature is lower than $-30°$ C., or if the outside air temperature is $-30°$ C. and the revolution speed of the compressor 7 is higher than 1000 rpm, the compressor is automatically stopped (caused not to start), as the probability that a suction portion of the compressor 7 is at a negative pressure when starting the compressor 7 is high.

When the outside air temperature is −20° C. and the revolution speed of the compressor 7 is 3000 rpm, it is predicted that the suction pressure (PS) of the compressor 7 is a predetermined value (for example −0.5 kg/cm$^2$ G). Therefore, if the compressor 7 is operating at 3000 rpm and the outside air temperature is lower than −20° C., or if the outside air temperature is −20° C. and the speed of the compressor 7 is higher than 3000 rpm, the compressor is automatically stopped (caused not to start), as the probability that a suction portion of the compressor 7 is at a negative pressure during startup is high.

As mentioned above, when the second refrigerant circuit (hot gas heater cycle) 22 is started during very low outside air temperature conditions (lower than −20° C., for example), when a physical quantity representative of the suction pressure of the compressor 7 is less than a predetermined value, the suction pressure of the compressor 7 is prevented from decreasing just after the compressor 7 is started by automatically stopping the compressor 7 to thereby stop an auxiliary warming operation, so that a negative pressure condition at the suction portion of the compressor 7 can be prevented.

Therefore, it is possible to prevent air from penetrating into the compressor 7 without having to modify the shaft seal portion, etc. of the compressor 7. Consequently, it is possible to inhibit cycle corrosion. Additionally, it is possible to prevent an abnormally high pressure state from occurring during first refrigerant circuit startup when the operating mode is in a cooler mode.

[Second Embodiment]

Figure 5:
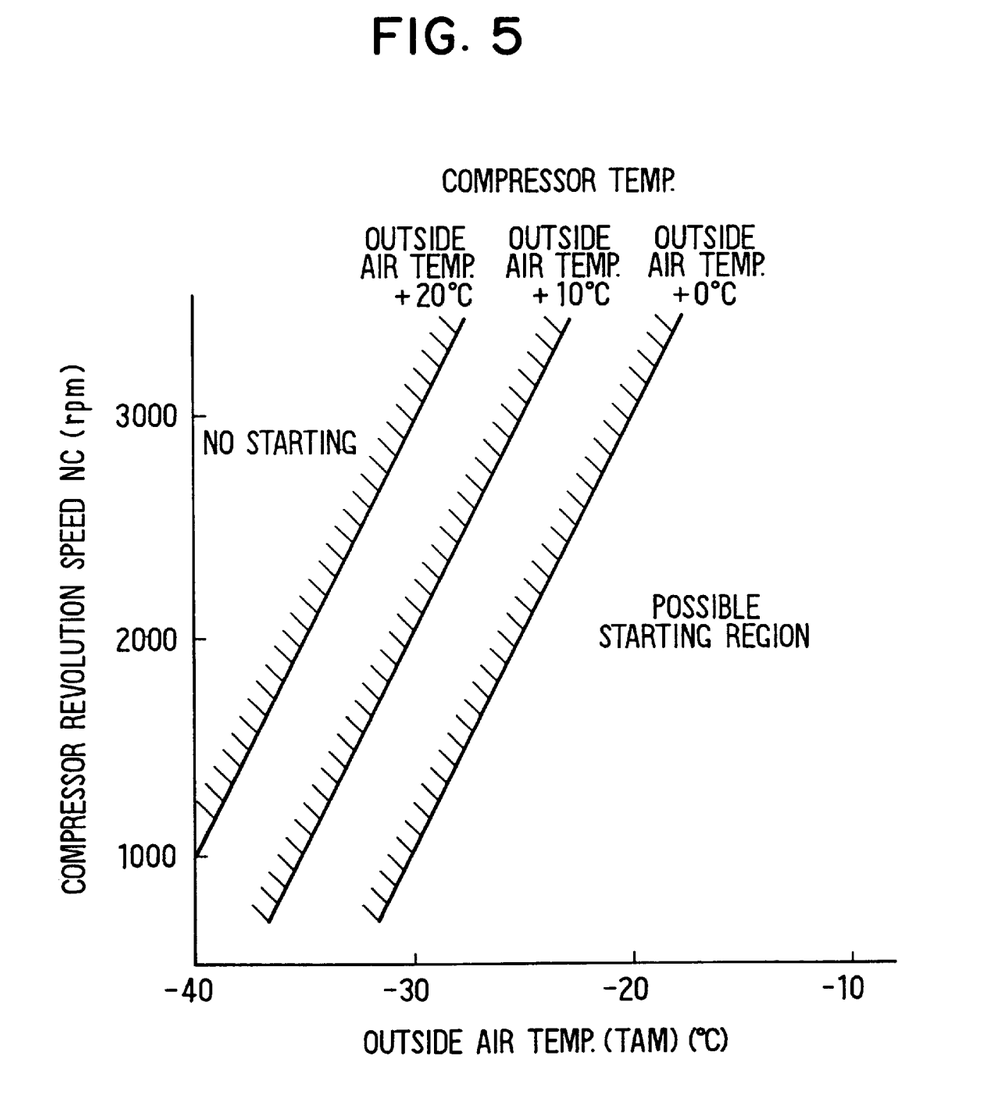
FIG. 5 is a graph showing a possible starting region of a compressor determined from compressor revolution speed and an outside air temperature according to a second embodiment of the present invention.

FIG. 5 shows a second embodiment of the present invention. In this embodiment, the suction pressure (PS) of the compressor 7 is determined as in the first embodiment. By correcting a determined possible starting region based on a temperature of the compressor 7 or a physical quantity corresponding to a temperature of the compressor 7 (for example, engine temperature, cooling water temperature, oil temperature, refrigerant pressure when the second refrigerant circuit 22 is stopped, and the like), the compressor 7 may be more easily started as the temperature of the compressor increases.

[Third Embodiment]

Figure 6:
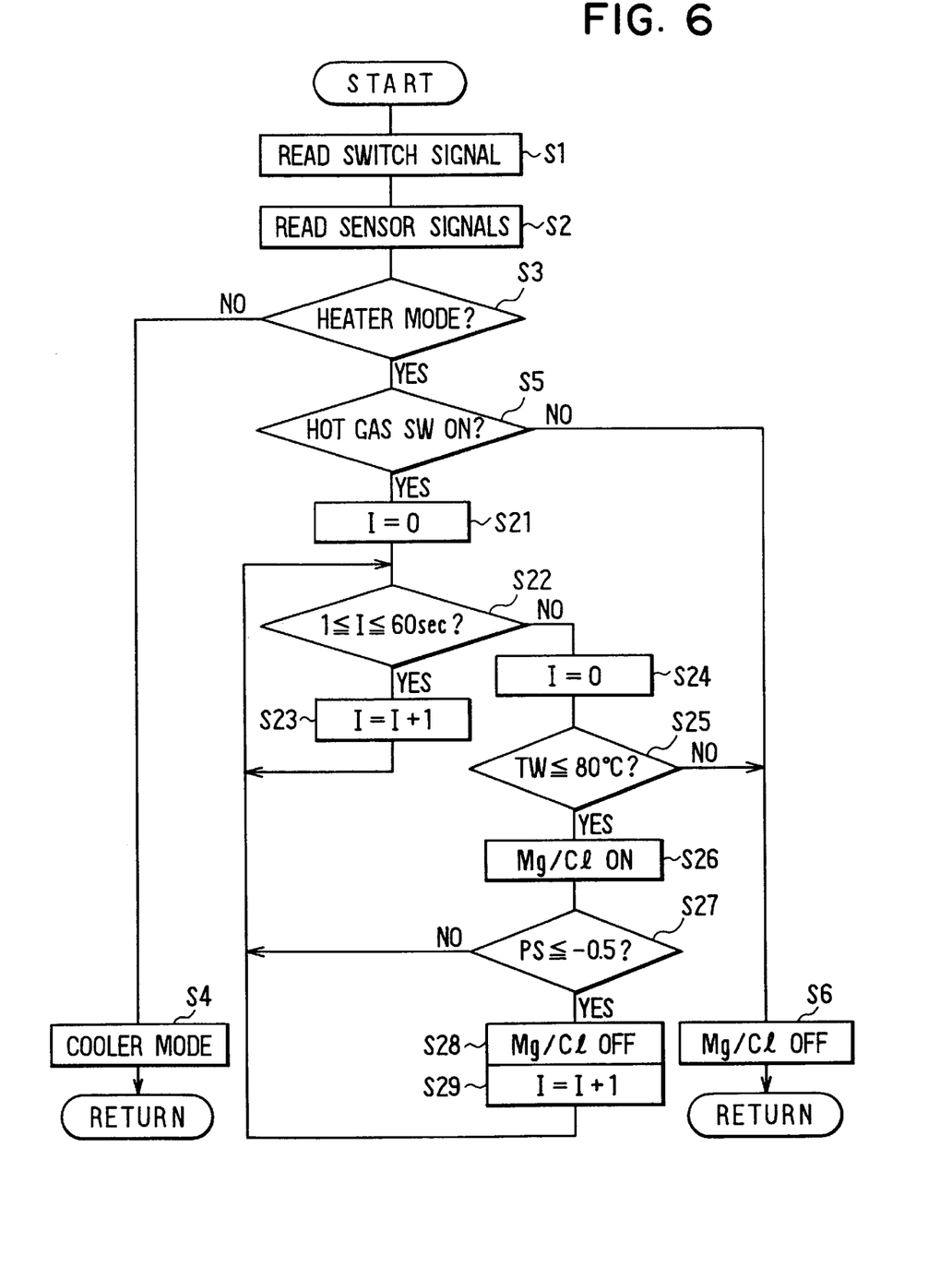
FIG. 6 is a flow diagram of compressor control methodology of an air conditioning ECU according to a third embodiment of the present invention.

FIG. 6 shows a third embodiment of the present invention. Here, control states identical to those in the flow diagram of FIG. 3 are denoted with identical numerals, and the corresponding description is omitted.

In this embodiment, a sensor signal from a not-shown refrigerant pressure switch (or refrigerant pressure sensor) is input to the air conditioning ECU 10. Therefore, it is possible to detect the suction pressure (PS) of the compressor 7.

In this embodiment, when a result of the determination in the step S5 is YES, i.e., when the hot gas switch 99 is ON, a timer circuit is reset (I=0) and started (step S21). Next, it is determined whether the count (I) of the timer circuit is at 0 or between 1 and 60 seconds (step S22). When a result of this determination is YES, the count (I) of the timer circuit is renewed (I=I+1) (step S23). Thereafter, control returns to the determination processing at step S22.

Further, when a result of the determination at step S22 is NO, the timer circuit is reset (I=0) and then started (step S24). Next, it is determined whether the cooling water temperature (TW) is lower than a predetermined temperature (for example 80° C.) (step S25). When this determination is NO, control processing proceeds to step S6.

Further, when the determination at step S25 is YES, the electromagnetic clutch (Mg/Cl) 8 is energized (ON) to thereby (re-)start the compressor 7, the first electromagnetic valve 23 is closed, the second electromagnetic valve 24 is opened, and thus the refrigerating cycle unit 20 is operated by the second refrigerant circuit 22 (step S26).

Next, it is determined whether the suction pressure (PS) of the compressor 7 detected by the pressure switch (or pressure sensor) is lower than a predetermined value (for example −0.5 kg/cm$^2$ G) (step S27). When this determination is NO, processing returns to step S22.

Further, when the determination at step 27 is YES, the electromagnetic clutch (Mg/Cl) 8 is de-energized (OFF) to thereby automatically stop the compressor 7, and the first and second electromagnetic valves 23, 24 are closed (step S28). The count (I) of the timer circuit is renewed (I=I+1) (step S29). Thereafter, processing returns to step S22.

As mentioned above, in this embodiment, the suction pressure (PS) of the compressor 7 is directly detected by the refrigerant pressure switch (or refrigerant pressure sensor). When the detected suction pressure (PS) is lower than a predetermined value (for example −0.5 kg/cm$^2$ G), the electromagnetic clutch 8 is turned OFF to thereby automatically stop the compressor 7 (hot gas heater cycle). Further, after a predetermined time (for example 60 seconds) has elapsed from when the hot gas heater cycle is automatically stopped, the electromagnetic clutch 8 is turned ON to thereby re-start the compressor 7.

Therefore, since the hot gas heater cycle can be re-started after a predetermined time has elapsed from when the hot gas cycle is automatically stopped, when the hot-water heater 5 of the hot-water warming unit 4 utilizing the cooling water of the engine provides insufficient heating, the hot-water heater 5 is assisted by hot gas guided to the evaporator 6, so that the vehicle interior can be rapidly warmed after the hot-water warming unit 4 is started.

[Other Embodiments]

Although the invention has been applied to a vehicle air conditioner refrigerating cycle apparatus, it may also be applied to the air conditioner refrigerating cycle apparatus of an airplane, a ship, a railway vehicle, and the like. Further, the invention may be applied to the air conditioner refrigerating cycle apparatus of a factory, a shop, a house, and the like.

While the above description constitutes the preferred embodiment of the present invention, the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A refrigerating cycle apparatus comprising:
    a first refrigerant circuit respectively including a refrigerant compressor for discharging a high temperature refrigerant, an external heat exchanger for receiving the discharged refrigerant, first pressure reducing means, and an internal heat exchanger for cooling air prior to the refrigerant being returned to the refrigerant compressor;
    a second refrigerant circuit respectively including second pressure reducing means and the internal heat exchanger for heating the conditioned air prior to the refrigerant being returned to the refrigerant compressor, the second refrigerant circuit bypassing the external heat exchanger;
    suction pressure detection means for detecting a physical quantity representative of a suction pressure of the refrigerant compressor; and air conditioning control means for controlling the refrigerant compressor such that the second refrigerant circuit is automatically stopped when the physical quantity detected by the suction pressure detection means is less than a predetermined value.

2. The refrigerating cycle apparatus of claim 1, wherein the air conditioning control means controls the refrigerant compressor such that the second refrigerant circuit is re-started after a predetermined elapsed time after being automatically stopped.

3. The refrigerating cycle apparatus of claim 1, wherein the suction pressure detection means includes outside air temperature detection means for detecting an outside air temperature, and revolution speed detection means for detecting a revolution speed of the refrigerant compressor; and the suction pressure detection means determines the suction pressure of the refrigerant compressor based on the detected outside air temperature and the detected compressor speed, sets a possible starting region of the refrigerant compressor based on the determined suction pressure, and controls the refrigerant compressor such that the second refrigerant circuit is started only in the possible starting region.

4. The refrigerating cycle apparatus of claim 3, wherein the suction pressure detection means corrects the possible starting region based on a physical quantity representing a temperature of the refrigerant compressor.

5. The refrigerating cycle apparatus of claim 4, wherein the physical quantity representing the temperature of the compressor is selected from the group consisting of: an engine cooling water temperature, an engine lubricating oil temperature, and a refrigerant pressure in the first and second refrigerant circuits.

6. A method of controlling operation of an auxiliary air heating circuit in a vehicle air conditioning system including a primary air heating circuit and the auxiliary air heating circuit, wherein the auxiliary air heating circuit circulates refrigerant discharged from a compressor, the method comprising the steps of:

monitoring a system operating mode;

determining a temperature of engine cooling water circulating through the primary air heating circuit when the step of monitoring indicates that the system operating mode is a heating mode;

determining if compressor operating parameters of the auxiliary air heating circuit falls within a predetermined compressor starting range by measuring outside air temperature and compressor revolution speed and estimating compressor suction pressure from the outside air temperature and the compressor revolution speed; and starting the auxiliary air heating circuit compressor when the compressor operating parameters fall within the predetermined compressor starting range.

7. The method of claim 6, further comprising the step of correcting the predetermined compressor starting range based on one of a temperature of the compressor and a physical quantity corresponding to the temperature of the compressor.

8. The method of claim 6, further comprising stopping the compressor and the auxiliary refrigerant circuit for a predetermined time when the suction pressure is below a predetermined level.

* * * * *